(12) United States Patent
Zia et al.

(10) Patent No.: US 12,400,336 B1
(45) Date of Patent: Aug. 26, 2025

(54) MACHINE LEARNING BASED SYSTEMS AND METHODS FOR OPTIMIZING INDUSTRIAL PROCESSES BY ANALYZING LAYOUTS OF ENVIRONMENTS

(71) Applicant: RETROCAUSAL, INC., Redmond, WA (US)

(72) Inventors: Muhammad Zeeshan Zia, Sammamish, WA (US); Quoc-Huy Tran, Redmond, WA (US); Andrey Konin, Redmond, WA (US)

(73) Assignee: Retrocausal, Inc., Redmond, WA (US)

( * ) Notice: Subject to any disclaimer, the term of this patent is extended or adjusted under 35 U.S.C. 154(b) by 0 days.

(21) Appl. No.: 19/045,582

(22) Filed: Feb. 5, 2025

Related U.S. Application Data

(60) Provisional application No. 63/704,571, filed on Oct. 8, 2024.

(51) Int. Cl.
| | | |
|---|---|---|
| G06K 9/00 | (2022.01) | |
| G06T 7/20 | (2017.01) | |
| G06T 7/70 | (2017.01) | |
| G06V 10/764 | (2022.01) | |
| G06V 40/20 | (2022.01) | |

(52) U.S. Cl.
CPC ............... G06T 7/20 (2013.01); G06T 7/70 (2017.01); G06V 10/764 (2022.01); G06V 40/25 (2022.01); *G06T 2207/20081* (2013.01); *G06T 2207/30241* (2013.01); *G06V 2201/07* (2022.01)

(58) Field of Classification Search
CPC ..................................................... G06F 30/27
See application file for complete search history.

(56) References Cited

U.S. PATENT DOCUMENTS

| | | | | |
|---|---|---|---|---|
| 10,989,038 | B1* | 4/2021 | Shen | ................... E21B 44/06 |
| 11,345,040 | B2* | 5/2022 | Oleynik | ............. G05B 19/4183 |
| 11,528,364 | B2* | 12/2022 | Lundsgaard | ........ H04M 3/5232 |
| 11,630,826 | B2* | 4/2023 | Neill | ................... G06F 16/9024 |
| | | | | 707/602 |
| 2019/0049957 | A1* | 2/2019 | Healey | ................. B60W 40/08 |
| 2020/0074307 | A1* | 3/2020 | Kent | ....................... G06N 20/00 |
| 2021/0276187 | A1* | 9/2021 | Tang | ........................ B25J 9/161 |
| 2022/0121181 | A1* | 4/2022 | Sobalvarro | ........ G05B 19/4188 |
| 2023/0039524 | A1* | 2/2023 | Bhageria | ................ B25J 9/0093 |
| 2023/0080873 | A1* | 3/2023 | Janka | ..................... G06F 30/27 |
| | | | | 703/7 |

* cited by examiner

*Primary Examiner* — Hadi Akhavannik
(74) *Attorney, Agent, or Firm* — Jason C. Cameron

(57) ABSTRACT

A ML-based method and system for optimizing industrial processes, is disclosed. The ML-based method includes: obtaining image data and video data associated with objects, from video capturing units installed on industrial floors; obtaining positioning information of the objects from positioning systems configured on the objects; computing trajectories for the objects, using a coordinate transformation module based on streams corresponding to the image data, the video data, and the positioning information; combining the trajectories associated with the objects, into a common coordinate frame, using the coordinate transformation module; determining data associated with tracks, and metadata, for the objects, using the coordinate transformation module; and combining information associated with the data associated with the tracks, and the metadata, to predict optimized industrial processes, using a combiner of a spatio-temporal reasoning engine with a machine learning (ML) model.

15 Claims, 8 Drawing Sheets

MACHINE LEARNING BASED SYSTEMS AND METHODS FOR OPTIMIZING INDUSTRIAL PROCESSES BY ANALYZING LAYOUTS OF ENVIRONMENTS

CROSS-REFERENCE TO RELATED APPLICATION(S)

This application claims the priority to incorporate by reference the entire disclosure of U.S. Provisional Patent Application No. 63/704,571, filed on Oct. 8, 2024, and titled "SYSTEM AND METHOD FOR ANALYZING FACTORY LAYOUT USING MOTION TRACKERS AND CAMERAS FOR INDUSTRIAL PROCESS IMPROVEMENT".

FIELD OF INVENTION

Embodiments of the present disclosure relate to machine learning based (ML-based) analyzing systems, and more particularly relates to a machine learning based (ML-based) method and system for analyzing layouts of one or more environments including at least one of: factories, warehouses, surgical operation theatres, kitchens, restaurants, department stores and shopping malls, and the like, to optimize industrial processes.

BACKGROUND

Frontline workers, customers, and material handling tools including at least one of: forklifts and trolleys, navigate different environments with purpose as they carry out their daily responsibilities. These environments include a wide range of settings including at least one of: factories, warehouses, operating rooms, kitchens, restaurants, department stores, shopping centers, and the like.

The physical positioning of assets, including at least one of: machines, storage cabinets, bins, raw materials, finished goods, and other individuals, along with the necessary steps for completing a task, determines the movements required by both people (including the frontline workers, the customers, and others) and mobile equipment (e.g., the trolleys, the forklifts, and carts). Examples of such activities include assembling a product on a factory line or production cell, carrying out a machine changeover (e.g., replacing dies, adjusting settings, or reconfiguring tools) to at least one of: manufacture of a different product, performing surgery in an operating theatre, or preparing a specific dish in a kitchen.

For example, in a context of changeovers, which is switching of a production process from making one product to another, challenges arise from at least one of: inefficient movement patterns, poor layout design, and lack of standardized tools, which can cause delays during the changeovers. The frontline workers may waste time moving across the facility to gather tools or materials if assets are poorly located, while congestion from multiple workers or equipment, including forklifts, can create bottlenecks. Additionally, coordination issues and communication breakdowns may require the frontline workers to move unnecessarily, extending changeover time. Streamlining movements, optimizing layouts, and ensuring tool availability, are essential to minimize these inefficiencies and reduce setup times.

Analyzing activities across a section of a floor, an entire floor, multiple levels, or even several buildings and understanding their impact on productivity, quality, and safety can be a complex task. The analysis of the activities often requires one or more analysts, including Industrial Engineers (IEs), to observe individuals (including the frontline workers, customers, and material handling equipment) within the environment over long durations, taking detailed manual notes throughout the process.

For example, for an industrial engineer analyzing the changeover process, key challenges include tracking worker movements across large areas including multiple floors or buildings, which is time-consuming and labor-intensive. The engineer must manually follow frontline workers as they retrieve tools or parts from distant locations, often involving long walks and delays. Coordinating with material handling equipment, like forklifts, adds complexity when availability is limited or equipment is located far away. Additionally, the industrial engineer must account for safety risks, including at least one of: navigating congested aisles and waiting for equipment. This manual observation process requires extensive effort to capture productivity losses, inefficiencies, and safety concerns.

Further, the conventional analyzing techniques face challenges in designing and optimizing an arrangement of assets within an environment to enhance productivity, quality, or safety, to reduce the time operators spend walking between stations and machines to assemble a product, perform machine setups, or conduct changeovers for producing a specific item, and minimize hand movements required by an operator at an assembly station by identifying more efficient placements for tools and bins.

For example, in the context of the changeover process, it is similarly challenging to design and improve the layout of assets in the factory to optimize productivity, quality, and safety. For example, reducing the walk time of operators as they move between machines to perform die changeovers is crucial for minimizing setup times. A poorly arranged layout may require workers to travel long distances to fetch tools or parts, significantly extending the changeover process.

Hence, there is a need for an improved machine learning based (ML-based) system and method for analyzing layouts of one or more environments to optimize industrial processes, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) method for optimizing one or more industrial processes, is disclosed. The ML-based method comprises obtaining, by one or more hardware processors, at least one of: image data and video data associated with one or more objects, from one or more video capturing units installed on one or more industrial floors. The one or more objects comprise at least one of: one or more first objects and one or more second objects.

The ML-based method further comprises obtaining, by the one or more hardware processors, positioning information of the one or more second objects from one or more positioning systems configured on the one or more second objects.

The ML-based method further comprises computing, by the one or more hardware processors, one or more trajectories for at least one of: the one or more first objects and the one or more second objects, using a coordinate transformation module, based on one or more streams corresponding to at least one of: the image data, the video data, and the positioning information.

The ML-based method further comprises combining, by the one or more hardware processors, the one or more trajectories associated with at least one of: the one or more first objects and the one or more second objects, into a common coordinate frame, using the coordinate transformation module.

The ML-based method further comprises determining, by the one or more hardware processors, at least one of: data associated with one or more tracks, and metadata, for at least one of: the one or more first objects and the one or more second objects, using the coordinate transformation module. The metadata comprise at least one of: subsequent locations of at least one of: the one or more first objects and the one or more second objects, a type of movements of at least one of: the one or more first objects and the one or more second objects, and a state of at least one of: the one or more first objects and the one or more second objects.

The ML-based method further comprises combining, by the one or more hardware processors, information associated with at least one of: the data associated with the one or more tracks, and the metadata, to predict one or more optimized industrial processes, using a combiner of a spatio-temporal reasoning engine with a machine learning (ML) model. The information is corresponding to a plurality of instances of one or more activities with one or more objectives associated with one or more industrial processes.

In an embodiment, the ML-based method further comprises (a) generating, by the one or more hardware processors, one or more reports and statistics associated with at least one of: movements and activities of at least one of: the one or more first objects and the one or more second objects, and one or more actions performed by at least one of: the one or more first objects and the one or more second objects, on one or more assets across the industrial floors; and (b) providing, by the one or more hardware processors, one or more recommendations on the one or more optimized industrial processes based on at least one of: the movements, activities, and actions, of at least one of: the one or more first objects and the one or more second objects. The one or more optimized industrial processes comprise mitigation of time required to perform at least one of: changeovers, automatic line rebalancing, sequencing of production orders, packaging of one or more products across one or more stations.

In another embodiment, computing the one or more trajectories for at least one of: the one or more first objects and the one or more second objects, comprises: (a) detecting, by the one or more hardware processors, at least one of: the one or more first objects, the one or more second objects, and one or more actions performed by at least one of: the one or more first objects, the one or more second objects, in an individual frame of the video data, wherein the one or more first objects comprise one or more static objects, and wherein the one or more second objects comprise one or more moving objects; (b) tracking, by the one or more hardware processors, the detected at least one of: the one or more objects and the one or more actions, across one or more frames of the video data to compute the one or more trajectories; and (c) computing, by the one or more hardware processors, one or more locations by comparing the positioning information of the one or more second objects with infrastructure elements of the one or more positioning systems to compute the one or more trajectories.

In yet another embodiment, the ML-based method further comprises applying, by the one or more hardware processors, calibration information into the one or more trajectories to manage geometric relationship between at least one of: the image data, the video data, and the positioning information of the one or more assets.

In yet another embodiment, predicting the one or more optimized industrial processes comprises classifying, by the one or more hardware processors, the one or more tracks into one or more classes comprising at least one of: idle, walk, run, work, value added time, non-value added time, for at least one of: the one or more first objects and the one or more second objects, using the spatio-temporal reasoning engine with the ML model.

In yet another embodiment, the ML-based method further comprises training, by the one or more hardware processors, the ML model, by: (a) obtaining, by the one or more hardware processors, one or more training datasets indicating the one or more classes comprising at least one of: idle, walk, run, work, value added time, and non-value added time, for at least one of: the one or more first objects and the one or more second objects, wherein the one or more training datasets comprise at least one of: image data, video data, two dimensional tracking data, and three dimensional tracking data, which are classified into the one or more classes; (b) training, by the one or more hardware processors, the ML model on the one or more training datasets based on one or more model parameters; and (c) classifying, by the one or more hardware processors, the one or more tracks into one or more classes comprising at least one of: idle, walk, run, work, value added time, and non-value added time, for at least one of: the one or more first objects and the one or more second objects, based on the trained ML model.

In yet another embodiment, predicting the one or more optimized industrial processes further comprises determining, by the one or more hardware processors, one or more alternative static asset locations to perform the one or more objectives using at least one of: brute-force based layout search, a graph based algorithmic search, and a randomized layout search.

In yet another embodiment, predicting the one or more optimized industrial processes further comprises generating, by the one or more hardware processors, one or more inferences related to one or more precedence relationships between the one or more actions. The one or more precedence relationships between the one or more actions are computed using the ML model.

In yet another embodiment, predicting the one or more optimized industrial processes further comprises providing, by the one or more hardware processors, one or more alternative activities for performing the one or more industrial processes upon detecting at least one of: individual assembly, packing, and setup steps, in the one or more video capturing units.

In one aspect, a machine learning based (ML-based) system for optimizing one or more industrial processes, is disclosed. The ML-based system includes one or more hardware processors and a memory coupled to the one or more hardware processors. The memory includes a plurality of subsystems in the form of programmable instructions executable by the one or more hardware processors.

The plurality of subsystems comprises a data obtaining subsystem configured to: (a) obtain at least one of: image data and video data associated with one or more objects, from one or more video capturing units installed on one or more industrial floors, wherein the one or more objects comprise at least one of: one or more first objects and one or more second objects; and (b) obtain positioning information of the one or more second objects from one or more positioning systems configured on the one or more second objects.

The plurality of subsystems further comprises a trajectories computing subsystem configured to compute one or more trajectories for at least one of: the one or more first objects and the one or more second objects, using a coordinate transformation module, based on one or more streams corresponding to at least one of: the image data, the video data, and the positioning information.

The plurality of subsystems further comprises a coordination subsystem configured to combine the one or more trajectories associated with at least one of: the one or more first objects and the one or more second objects, into a common coordinate frame, using the coordinate transformation module.

The plurality of subsystems further comprises an object tracks determining subsystem configured to determine at least one of: data associated with one or more tracks, and metadata, for at least one of: the one or more first objects and the one or more second objects, using the coordinate transformation module. The metadata comprise at least one of: subsequent locations of at least one of: the one or more first objects and the one or more second objects, a type of movements of at least one of: the one or more first objects and the one or more second objects, and a state of at least one of: the one or more first objects and the one or more second objects.

The plurality of subsystems further comprises an industrial process predicting subsystem configured to combine information associated with at least one of: the data associated with the one or more tracks, and the metadata, to predict one or more optimized industrial processes, using a combiner of a spatio-temporal reasoning engine with a machine learning (ML) model. The information is corresponding to a plurality of instances of one or more activities with one or more objectives associated with one or more industrial processes.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
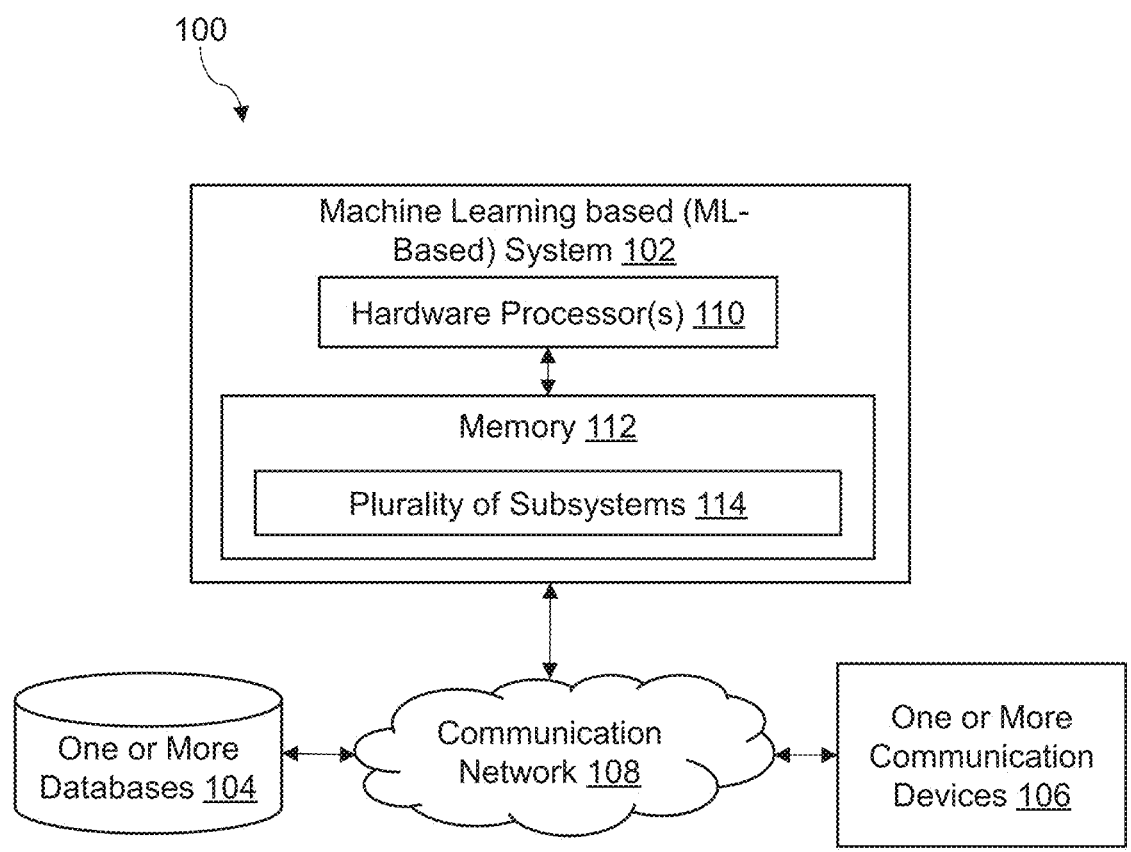
FIG. 1 is a block diagram illustrating a computing environment with a machine learning based (ML-based) system for optimizing one or more industrial processes by analyzing one or more layouts of one or more environments, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional submodules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) system 102 for optimizing one or more industrial processes by analyzing one or more layouts of one or more environments, in accordance with an embodiment of the present disclosure. According to FIG. 1, The ML-based system 102 may be communicatively coupled to the one or more databases 104, and the one or more communication devices 106 via a communication network 108. The communication network 108 may be a wired communication network and/or a wireless communication network. The one or more databases 104 may include, but not limited to, storing, managing, and organizing data related to various aspects of an operation of the ML-based system 102.

The present invention is configured to analyze the one or more layouts (e.g., factory layouts) of one or more environments for optimizing one or more industrial processes. The ML-based system 102 is initially configured to obtain at least one of: image data and video data associated with one or more objects, from one or more video capturing units installed on one or more industrial floors. In an embodiment, the one or more objects may include at least one of: one or more first objects and one or more second objects.

The ML-based system 102 is further configured to obtain positioning information of the one or more second objects from one or more positioning systems configured on the one or more second objects. The ML-based system 102 is further configured to compute one or more trajectories for at least one of: the one or more first objects and the one or more second objects, using a coordinate transformation module, based on one or more streams corresponding to at least one of: the image data, the video data, and the positioning information.

The ML-based system 102 is further configured to combine the one or more trajectories associated with at least one of: the one or more first objects and the one or more second objects, into a common coordinate frame, using the coordinate transformation module. The ML-based system 102 is further configured to determine at least one of: data associated with one or more tracks, and metadata, for at least one of: the one or more first objects and the one or more second objects, using the coordinate transformation module. In an embodiment, the metadata may include at least one of: subsequent locations of at least one of: the one or more first objects and the one or more second objects, a type of movements of at least one of: the one or more first objects and the one or more second objects, and a state of at least one of: the one or more first objects and the one or more second objects.

The ML-based system 102 is further configured to combine information associated with at least one of: the data associated with the one or more tracks, and the metadata, to predict one or more optimized industrial processes, using a combiner of a spatio-temporal reasoning engine. In an embodiment, the information is corresponding to a plurality of instances of one or more activities with one or more objectives associated with one or more industrial processes.

The one or more databases 104 may be any kind of databases including, but not limited to, relational databases, non-relational databases, graph databases, document databases, dedicated databases, dynamic databases, monetized databases, scalable databases, cloud databases, distributed databases, any other databases, and a combination thereof. The one or more databases 104 is configured to support the functionality of the ML-based system 102 and enables efficient data retrieval and storage for various aspects associated with at least one of: the generation of the one or more predetermined motion time system (PMTS) representations, the computation of the one or more trajectories, the combination of the one or more trajectories, the determination of at least one of: data associated with one or more tracks, and metadata, the optimization and prediction of the one or more optimized industrial processes.

The ML-based system 102 may be hosted on a central server including at least one of: a cloud server or a remote server. In an embodiment, the ML-based system 102 may include at least one of: a user device, a server computer, a server computer over the communication network 108, a cloud-based system, a cloud-based system over the communication network 108, a distributed system, and the like. Further, the communication network 108 may be at least one of: a Wireless-Fidelity (Wi-Fi) connection, a hotspot connection, a Bluetooth connection, a local area network (LAN), a wide area network (WAN), any other wireless network, and the like.

In an embodiment, the one or more communication devices 106 may include at least one of: a laptop computer, a desktop computer, a tablet computer, a Smartphone, a wearable device, a Smart watch, and the like. Furthermore, the one or more communication devices 106 include at least one of: a local browser, a mobile application, and the like. Furthermore, a web application may be used through the local browser and the mobile application to communicate with the ML-based system 102. In an embodiment of the present disclosure, the ML-based system 102 includes a plurality of subsystems 114. Details on the plurality of subsystems 114 have been elaborated in subsequent paragraphs of the present description with reference to FIG. 2.

Further, the ML-based system 102 may be implemented by way of a single device or a combination of multiple devices that may be operatively connected or networked together. The ML-based system 102 may be implemented in hardware or a suitable combination of hardware and software. The ML-based system 102 includes one or more hardware processors 110, and a memory 112. The memory 112 may include the plurality of subsystems 114. The ML-based system 102 may be a hardware device including the one or more hardware processors 110 executing machine-readable program instructions for optimizing one or more industrial processes based on the analysis of the one or more layouts of the one or more environments.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory 112 operationally coupled with the ML-based system 102 for performing tasks such as data processing, input/output processing, and/or any other functions. Any reference to a task in the present disclosure may refer to an operation being or that may be performed on data.

Though a few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, any other devices, and combination thereof. A person skilled in the art should not be limiting the components/subsystems shown in FIG. 1.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the ML-based system 102 as is unique to the present disclosure or necessary for an understanding of the present disclosure is depicted and described. The remainder of the construction and operation of the ML-based system 102 may conform to any of the various current implementations and practices that were known in the art.

Figure 2:
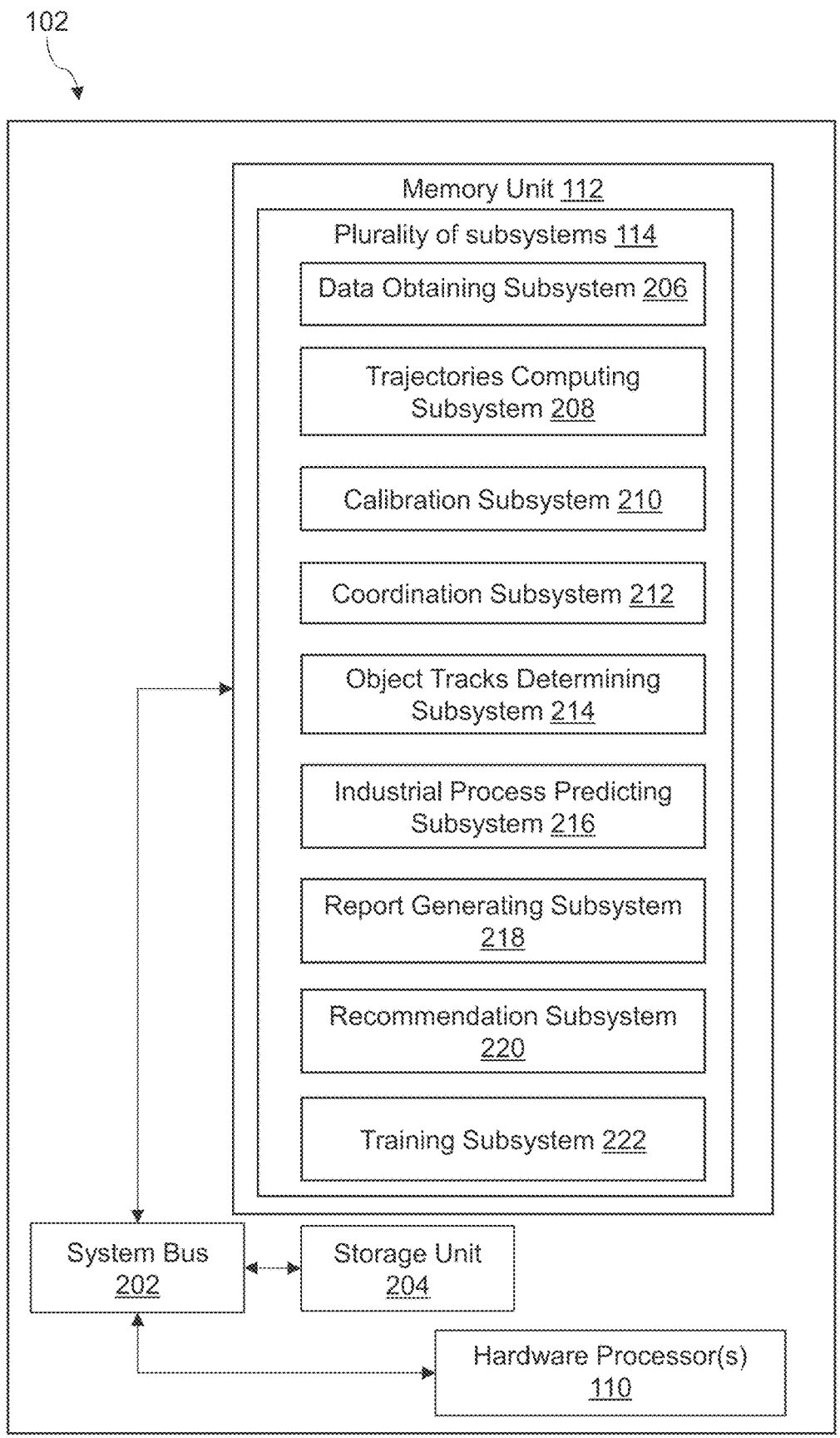
FIG. 2 is a detailed view of the ML-based system for optimizing the one or more industrial processes by analyzing the one or more layouts of the one or more environments, in accordance with another embodiment of the present disclosure.

FIG. 2 is a detailed view of the ML-based system 102 for optimizing the one or more industrial processes by analyzing the one or more layouts of the one or more environments, in accordance with another embodiment of the present disclosure.

The ML-based system 102 includes the memory 112, the one or more hardware processors 110, and a storage unit 204. The memory 112, the one or more hardware processors 110, and the storage unit 204 are communicatively coupled through a system bus 202 or any similar mechanism. The memory 112 includes the plurality of subsystems 114 in the form of programmable instructions executable by the one or more hardware processors 110.

The plurality of subsystems 114 includes a data obtaining subsystem 206, a trajectories computing subsystem 208, a calibration subsystem 210, a coordination subsystem 212, an object tracks determining subsystem 214, an industrial process predicting subsystem 216, a report generating subsystem 218, a recommendation subsystem 220, and a training subsystem 222.

The one or more hardware processors 110, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, including at least one of: generic or programmable logic devices or arrays, application specific integrated circuits, single-chip computers, and the like.

The memory 112 may be non-transitory volatile memory and non-volatile memory. The memory 112 may be coupled for communication with the one or more hardware processors 110, being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 114 stored in the form of machine-readable instructions on any of the above-mentioned storage media and may be in communication with and executed by the one or more hardware processors 110.

The storage unit 204 may be a cloud storage, a Structured Query Language (SQL) data store, a noSQL database or a location on a file system directly accessible by the plurality of subsystems 114.

The plurality of subsystems 114 includes the data obtaining subsystem 206 that is communicatively connected to the one or more hardware processors 110. The data obtaining subsystem 206 is configured to obtain at least one of: the image data and the video data associated with the one or more objects, from the one or more video capturing units installed on the one or more industrial floors. In an embodiment, the one or more video capturing units may include at least one of: one or more camera devices, one or more video recorders, one or more devices including a video capturing configurations, and the like. In an embodiment, the one or more objects may include at least one of: one or more first objects and one or more second objects. The one or more first objects may be one or more static objects and the one or more second objects may be one or more moving objects.

The data obtaining subsystem 206 is further configured to obtain the positioning information of the one or more second objects from the one or more positioning systems configured on the one or more second objects. In an embodiment, the one or more positioning systems may include at least one of: Indoor Positioning System (IPS) sensors (e.g. Ultra-wideband (UWB) and/or Bluetooth Low Energy (BLE) tags) and Outdoor Positioning Systems (e.g. Global Positioning System (GPS)) installed on at least one of: the one or more second objects and the one or more moving assets (the one or more moving assets move on the factory floor and amongst different levels on the factory or other environments).

The plurality of subsystems 114 further includes the trajectories computing subsystem 208 that is communicatively connected to the one or more hardware processors 110. The trajectories computing subsystem 208 is configured to compute the one or more trajectories for at least one of: the one or more first objects and the one or more second objects, using the coordinate transformation module, based on the one or more streams corresponding to at least one of: the image data, the video data, and the positioning information.

For computing the one or more trajectories for at least one of: the one or more first objects and the one or more second objects, the trajectories computing subsystem 208 is initially configured to detect at least one of: the one or more first objects, the one or more second objects, and one or more actions performed by at least one of: the one or more first objects, the one or more second objects, in an individual frame of the video data. The trajectories computing subsystem 208 is further configured to track the detected at least one of: the one or more objects and the one or more actions, across one or more frames of the video data to compute the one or more trajectories. The trajectories computing subsystem 208 is further configured to compute one or more locations by comparing the positioning information of the one or more second objects with infrastructure elements of the one or more positioning systems to compute the one or more trajectories.

The plurality of subsystems 114 further includes the calibration subsystem 210 that is communicatively connected to the one or more hardware processors 110. The calibration subsystem 210 is configured to apply calibration information into the one or more trajectories to manage geometric relationship between at least one of: the image data, the video data, and the positioning information of the one or more assets.

The plurality of subsystems 114 further includes the coordination subsystem 212 that is communicatively connected to the one or more hardware processors 110. The coordination subsystem 212 is configured to combine the one or more trajectories associated with at least one of: the one or more first objects and the one or more second objects, into a common coordinate frame, using the coordinate transformation module.

The plurality of subsystems 114 further includes the object tracks determining subsystem 214 that is communicatively connected to the one or more hardware processors 110. The object tracks determining subsystem 214 is configured to determine at least one of: the data associated with the one or more tracks, and the metadata, for at least one of: the one or more first objects and the one or more second objects, using the coordinate transformation module. In an embodiment, the metadata may include at least one of: the subsequent locations of at least one of: the one or more first objects and the one or more second objects, the type of movements of at least one of: the one or more first objects and the one or more second objects (e.g., human walking versus standing still versus sitting), and the state (i.e., machine state, level high/low, light ON/OFF) of at least one of: the one or more first objects and the one or more second objects.

In an embodiment, the ML-based system 102 may include a user interface configured to display the one or more assets (i.e., static assets, e.g., 2 dimensional (2D)/three dimensional (3D) location with video where available), 3D tracks, and tracks against floorplans) of the one or more assets (i.e., moving assets). The user interface is configured to allow the one or more users to change visualization and generate analytical information based on one or more queries raised from the one or more users.

The plurality of subsystems 114 further includes the industrial process predicting subsystem 216 that is communicatively connected to the one or more hardware processors 110. The industrial process predicting subsystem 216 is configured to combine the information associated with at least one of: the data associated with the one or more tracks, and the metadata, to predict the one or more optimized industrial processes, using the combiner of the spatio-temporal reasoning engine. In an embodiment, the information is corresponding to the plurality of instances of the one or more activities with the one or more objectives associated with the one or more industrial processes. For example, when different products/parts are being assembled on an assembly line, the corresponding activity/trajectory/machines involved in different products may be different. In an embodiment, a user may want to arrive at a good compromise factory layout which optimizes the assembly time (e.g. minimizes the walk time) corresponding to a weighted combination of parts that are built in a year, with the weights being the order volume from customers to build the corresponding parts/products. In another embodiment, a user may want to design standard operating procedures for a set of changeovers for pairs of products that need to be built on a given equipment and the combiner of the spatio-temporal reasoning engine module may determine the right weightings so that a good trade-off may be reached for different setup/startup times (for different products). In practice, such a combiner is commonly found in Lean Manufacturing literature e.g. reference A.

In an embodiment, the one or more optimized industrial processes may include mitigation of time required to perform at least one of: changeovers, automatic line rebalancing, sequencing of production orders, packaging of one or more products across one or more stations. In an embodiment, the industrial process predicting subsystem 218 is configured to classify the one or more tracks into one or more classes comprising at least one of: idle, walk, run, work, value added time, non-value added time, for at least one of: the one or more first objects and the one or more second objects, using the spatio-temporal reasoning engine with a machine learning (ML) model. In an embodiment, the machine learning model may include at least one of: a linear regression model, a logistic regression model, a decision tree model, a random forest model, a support vector machines (SVM) model, a neural network model, and the like.

The plurality of subsystems 114 further includes the training subsystem 222 that is communicatively connected to the one or more hardware processors 110. The training subsystem 222 is configured to train the ML model. The ML model may include at least one of: a neural network model, an ensemble learning model, and a support vector machine model. For training the ML model, the training subsystem 222 is initially configured to obtain one or more training datasets indicating the one or more classes comprising at least one of: "idle", "walk", "run", "value added time", "non-value added time" for one or more first and the one or more second objects. In an embodiment, the one or more datasets may include one or more video examples/data associated with at least one of: the one or more classes, two dimensional (2D) tracking data, and three dimensional (3D)

tracking data. In an embodiment, the video examples, including at least one of: a convolutional 3D network (C3D), an inflated 3D network (I3D), a long-short term memory network (LSTM), and one or more transformers, are classified using a classification model (e.g., a standard video classification model).

In another embodiment, the positioning stream (i.e., tracking data stream) may be classified using handcrafted rules with or without the ML model. In an embodiment, speed of motion may be used to classify the motion of an object into "idle", "walk", or "run". In an embodiment, end-user defined and subjective rules, such as whether the operator's hands or a forklift's forks are holding parts or are empty, may define whether the time is value added time or non-value added time. Operator's hands or forklift's forks and equivalent in this embodiment may be detected using a pose estimation model including at least one of: OpenPose or other human body pose estimation model, and an object detection model such as YOLO and the like.

The training subsystem 222 is further configured to train the ML model on the one or more training datasets based on one or more model parameters. In other words, the training of the ML model is performed on the one or more training datasets collected for a specific or for general factories or warehouses. In some embodiments, the ML-based system 102 may synthetically augment provided datasets (e.g. by automatically copying-and-pasting objects on other objects; or speeding up or slowing down a given motion video or track data). The tuning of the one or more model parameters on the one or more training datasets may be performed on one or more hardware processors 110, which may be the same or different from the one or more hardware processors 110 on which the ML model subsequently evaluates test-time data. The training models used for the training process, are standard models for the corresponding machine learning approach being used, including at least one of: gradient descent or stochastic gradient descent for neural networks and Bagging (i.e., Bootstrap Aggregation) for ensemble approaches including Random Forests. The training subsystem 222 is further configured to classify the one or more tracks into the one or more classes including at least one of: idle, walk, run, work, value added time, and non-value added time, for at least one of: the one or more first objects and the one or more second objects, based on the trained ML model.

In an embodiment, the industrial process predicting subsystem 218 is further configured to determine one or more alternative static asset locations (i.e. simulating alternatives to static asset locations) to perform the one or more objectives using at least one of: the brute-force based layout search, a graph based algorithmic search, and a randomized layout search. In an embodiment, the industrial process predicting subsystem 218 is further configured to utilize Dijkstra's algorithm or Warshall's algorithm to perform a graph based algorithmic search. In an embodiment, one or more randomized searches (e.g., Markov Chain Monte Carlo (MCMC) or Gibb's Sampling) to determine the one or more alternative static asset locations. In an embodiment, the user may specify constraints (e.g., "monuments") which are stations or machines which are immovable and/or pillar locations and other locations where any stations/machines cannot be placed.

In an embodiment, the industrial process predicting subsystem 218 is further configured to utilize one or more industrial engineering analyses being applied to the one or more trajectories (e.g., "To-From Matrices", "Spaghetti diagrams", "Time spent on given station", "Time spent walking", and the like. In an embodiment, the industrial process predicting subsystem 218 is further configured to utilize "step-level precedence" information provided by the user through the user interface, which specifies steps that a given step treats as a pre-requisite (e.g., until a screw driver is picked, a screw cannot be tightened), so that the two steps may not be performed in parallel. In some embodiments, the industrial process predicting subsystem 218 is configured to generate one or more inferences related to one or more precedence relationships between actions/steps. In an embodiment, the one or more precedence relationships between the one or more actions are computed using the ML model.

In an embodiment, the industrial process predicting subsystem 218 is further configured to provide one or more alternative activities for performing the one or more industrial processes upon detecting at least one of: individual assembly, packing, and setup steps, in the one or more video capturing units. In an embodiment, such a search for the one or more trajectories keeps the step-precedence information into consideration. In another embodiment, the industrial process predicting subsystem 218 is further configured to detect individual assembly or packing or setup steps in the camera feed (i.e., video data) and provide an alternative/improved set of steps which maybe hardcoded or obtained from the machine learning model.

In an embodiment, the industrial process predicting subsystem 218 is further configured to provide rules and signals to sequence production orders for different products to optimize production volume or other metrics. In an embodiment, this optimization is based on computed trajectories and analytics for different product builds.

The plurality of subsystems 114 further includes the report generating subsystem 218 that is communicatively connected to the one or more hardware processors 110. The report generating subsystem 218 is configured to generate one or more reports and statistics associated with at least one of: movements and activities of at least one of: the one or more first objects and the one or more second objects, and one or more actions performed by at least one of: the one or more first objects and the one or more second objects, on one or more assets across the industrial floors.

The plurality of subsystems 114 further includes the recommendation subsystem 220 that is communicatively connected to the one or more hardware processors 110. The recommendation subsystem 220 is configured to provide the one or more recommendations on the one or more optimized industrial processes based on at least one of: the movements, activities, and actions, of at least one of: the one or more first objects and the one or more second objects.

Figure 3:
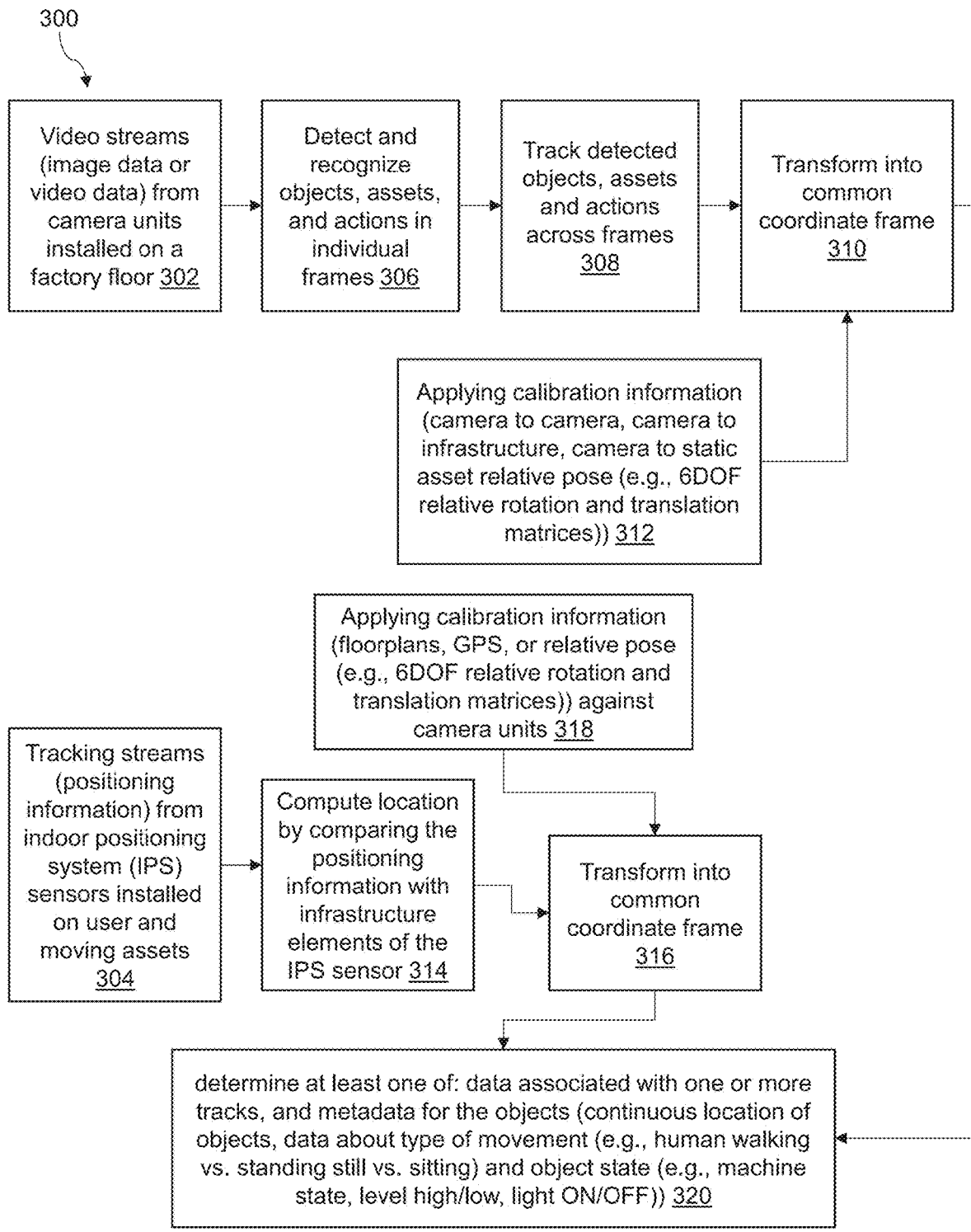
FIG. 3 is a process flow of determining at least one of: data associated with one or more tracks, and metadata, for at least one of: one or more first objects and one or more second objects, using a coordinate transformation module, in accordance with an embodiment of the present disclosure.

FIG. 3 is a process flow 300 of determining at least one of: the data associated with one or more tracks, and the metadata, for at least one of: the one or more first objects and the one or more second objects, using the coordinate transformation module, in accordance with an embodiment of the present disclosure. At step 302, at least one of: the image data and the video data associated with the one or more objects, is obtained from the one or more video capturing units installed on the one or more industrial floors. At step 304, the positioning information of the one or more second objects is obtained from the one or more positioning systems configured on the one or more second objects.

At step 306, at least one of: the one or more second objects, one or more moving assets (e.g., fork lifts and Automated guided vehicles (AGVs)) and the one or more actions, are detected and recognized in one or more individual frames. At step 308, the detected at least one of: the one or more objects and the one or more actions, across one or more frames of the video data to compute the one or more trajectories, are tracked. At step 310, the one or more trajectories associated with at least one of: the one or more first objects and the one or more second objects, are combined/transformed into the common coordinate frame, using the coordinate transformation module.

At step 312, the calibration information including at least one of: camera to camera, camera to infrastructure, camera to static asset relative pose (e.g., 6DOF relative rotation and translation matrices, is applied to the common coordinate frame. In an embodiment, the full 6-degree of freedom tracks are three spatial coordinates (x, y, z) and three angular coordinates pitch, yaw, roll, or a subset. At step 314, the one or more locations are computed by comparing the positioning information of the one or more second objects with infrastructure elements of the one or more positioning systems to compute the one or more trajectories. At step 316, the information associated with the positioning information of the one or more second objects are transformed into the common coordinate frame. At step 318, the calibration information including at least one of: floorplans, GPS, and relative pose (e.g., 6DOF relative rotation and translation matrices)) against camera units, is applied to the common coordinate frame.

At step 320, at least one of: the data associated with one or more tracks, and the metadata for the objects (continuous location of objects, data about type of movement (e.g., human walking vs. standing still vs. sitting) and object state (e.g., machine state, level high/low, light ON/OFF)), is determined based on the computed one or more trajectories using the coordinate transformation module.

Figure 4:
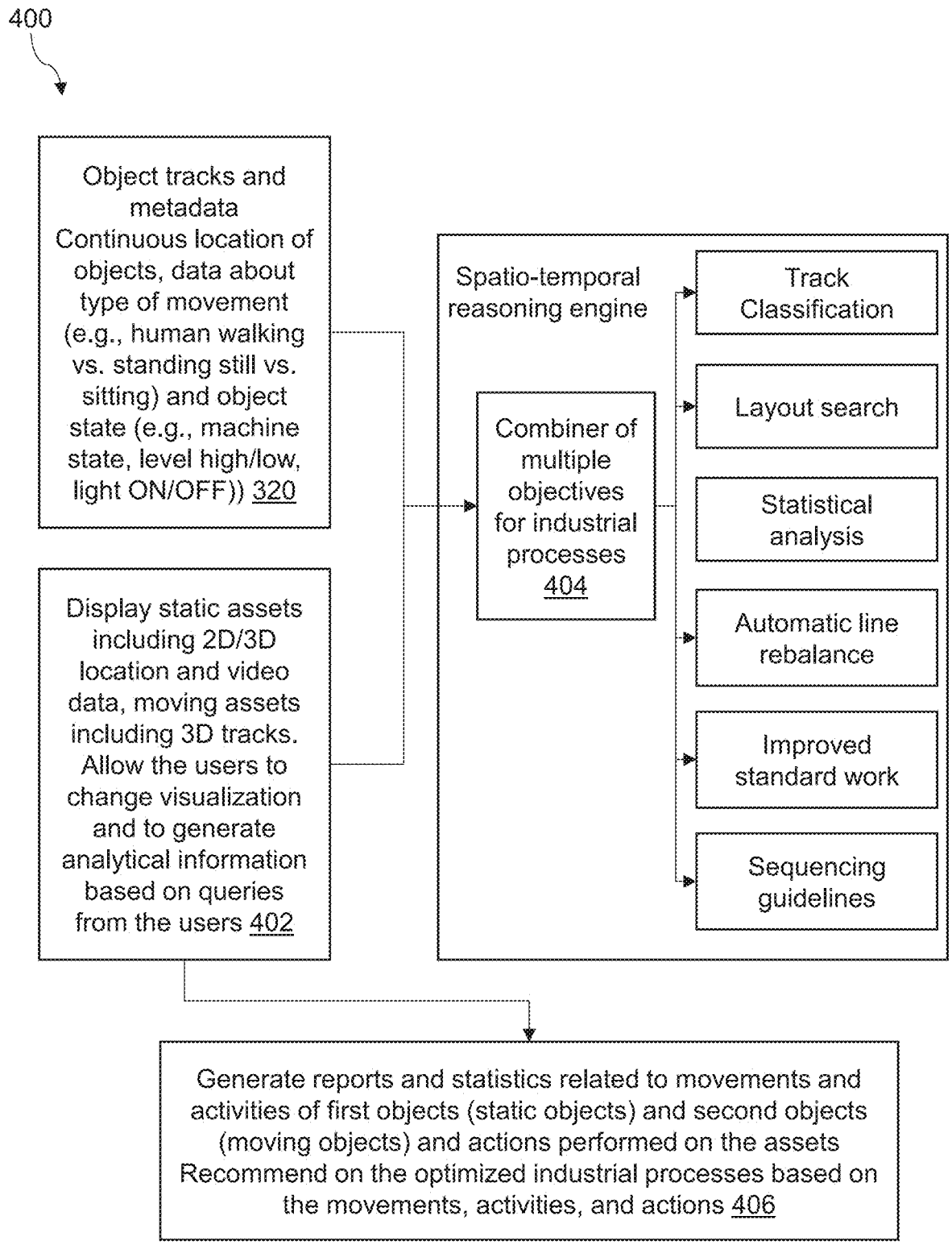
FIG. 4 is a process flow of predicting one or more optimized industrial processes based on the determined at least one of: data associated with one or more tracks, and metadata, using a spatio-temporal reasoning engine, in accordance with an embodiment of the present disclosure.

FIG. 4 is a process flow 400 of predicting the one or more optimized industrial processes based on the determined at least one of: the data associated with one or more tracks, and the metadata, using the spatio-temporal reasoning engine, in accordance with an embodiment of the present disclosure. At step 402, the one or more assets (i.e., static assets, e.g., 2 dimensional (2D)/three dimensional (3D) location with video where available), 3D tracks, and tracks against floorplans) of the one or more assets (i.e., moving assets) are displayed. The user interface is configured on computer displays, tablets or smartphones, augmented reality or virtual reality devices, multimedia projectors or other kinds of output devices. In an embodiment, the user interface obtains as input either from input devices or storage devices or network, different underlying objectives corresponding to different activity recordings e.g. different part numbers being assembled in a factory setting or different changeovers i.e. product from part X to part Y. In an embodiment, the user interface is configured to interact with the spatio-temporal reasoning engine that may perform computation on the one or more trajectories and action performed in the recorded data, to provide a variety of outputs.

At step 402, the one or more assets (i.e., static assets, e.g., 2 dimensional (2D)/three dimensional (3D) location with video where available), 3D tracks, and tracks against floorplans) of the one or more assets (i.e., moving assets), are displayed through the user interface of the ML-based system 102. In an embodiment, the user interface may allow the user to change the visualization and to generate analytical information based on the one or more queries raised by the user. At step 404, the combiner of the spatio-temporal reasoning engines combines the information associated with at least one of: the data associated with the one or more tracks, and the metadata (as shown in step 320), along with the outputs from the user interface (as shown in step 402), to predict one or more optimized industrial processes, using a combiner of the spatio-temporal reasoning engine. In an embodiment, the one or more optimized industrial processes may include at least one of: track classification, layout search, statistical analysis, automatic line rebalance, improved standard work, sequencing guidelines, and the like.

At step 406, the one or more reports and statistics associated with at least one of: movements and activities of at least one of: the one or more first objects and the one or more second objects, and one or more actions performed by at least one of: the one or more first objects and the one or more second objects, are generated on one or more assets across the industrial floors. Further, the ML-based system 102 is configured to provide one or more recommendations on the optimized industrial processes based on the movements, activities, and actions.

Figure 5:
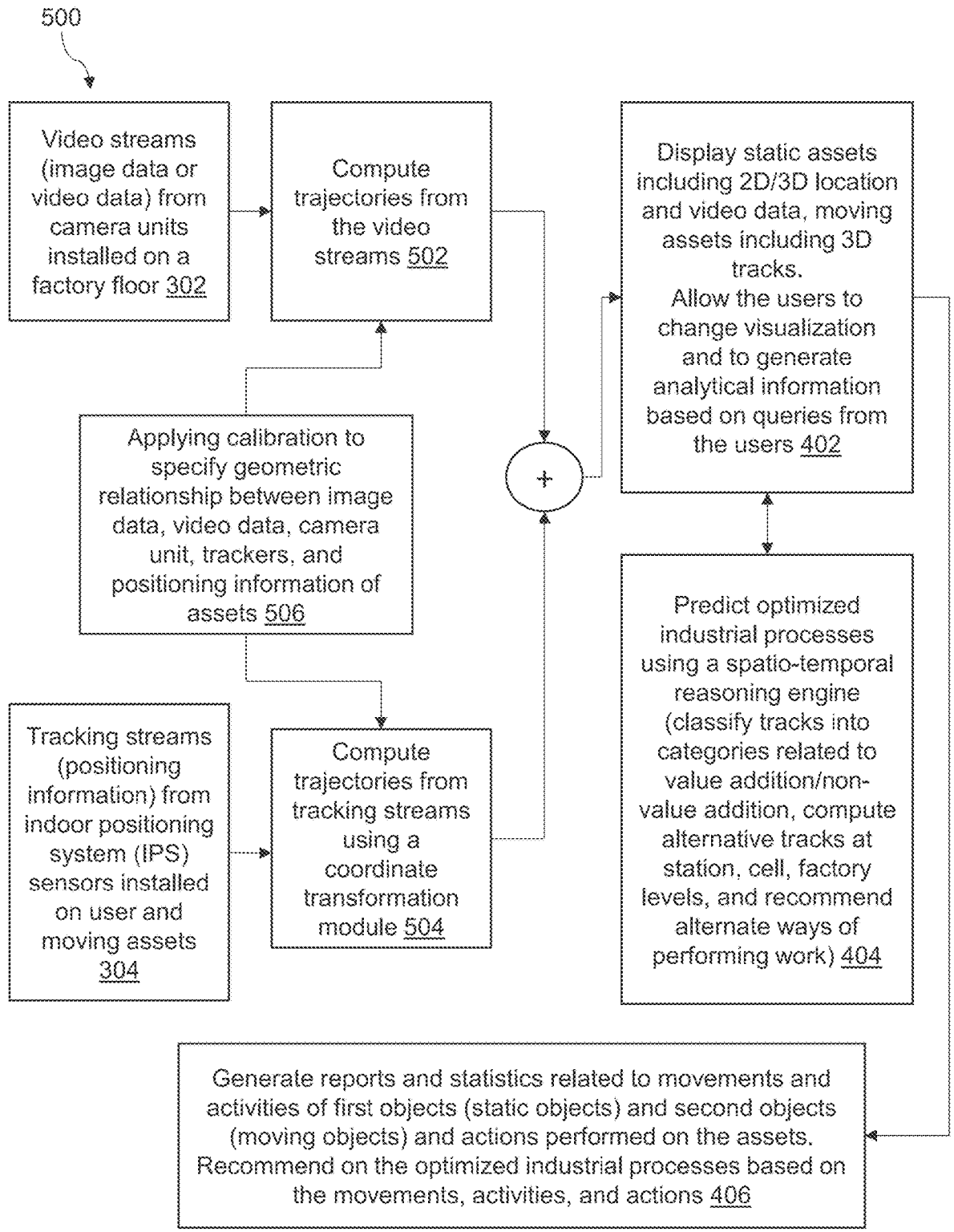
FIG. 5 is an overall process flow of optimizing the one or more industrial processes by analyzing the one or more layouts of the one or more environments, such as those shown in FIGS. 3-4, in accordance with an embodiment of the present disclosure.

FIG. 5 is an overall process flow 500 of optimizing the one or more industrial processes by analyzing the one or more layouts of the one or more environments, such as those shown in FIGS. 3-4, in accordance with an embodiment of the present disclosure. At step 502, the one or more trajectories are computed for at least one of: the one or more first objects and the one or more second objects, using the coordinate transformation module, based on one or more streams corresponding to at least one of: the image data, the video data, as shown in step 302. At step 504, the one or more trajectories are computed for at least one of: the one or more first objects and the one or more second objects, using the coordinate transformation module, based on one or more streams corresponding the positioning information, as shown in step 304.

At step 506, the calibration information is applied on the one or more trajectories to specify geometric relationship between image data, video data, camera unit, trackers, and positioning information of the one or more assets. In an embodiment, the computed one or more trajectories associated with at least one of: the one or more first objects and the one or more second objects, are combined into the common coordinate frame, using the coordinate transformation module to display the one or more assets (i.e., static assets, e.g., 2 dimensional (2D)/three dimensional (3D) location with video where available), 3D tracks, and tracks against floorplans) of the one or more assets (i.e., moving assets), as shown in step 402. In an embodiment, the optimized industrial processes are predicted using the spatio-temporal reasoning engine (i.e., classify tracks into categories related to value addition/non-value addition, compute alternative tracks at station, cell, factory levels, and recommend alternate ways of performing work), as shown in step 404.

In an embodiment, the one or more reports and statistics associated with at least one of: movements and activities of at least one of: the one or more first objects and the one or more second objects, and one or more actions performed by at least one of: the one or more first objects and the one or more second objects, are generated on one or more assets across the industrial floors, as shown in step 406. Further, the ML-based system 102 is configured to provide one or more recommendations on the optimized industrial processes based on the movements, activities, and actions, as shown in step 406.

Figure 6:
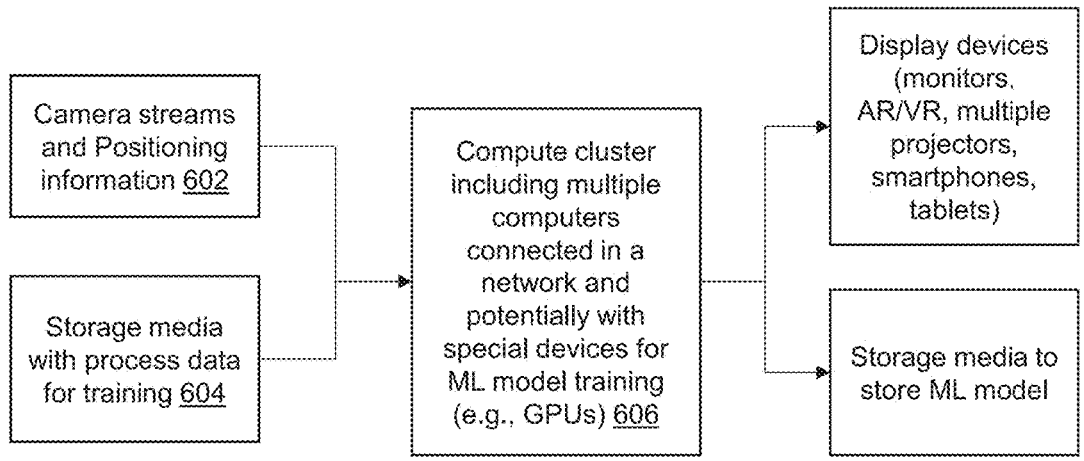
FIG. 6 is a process flow depicting a physical implementation of the ML-based system with ML training, in accordance with an embodiment of the present disclosure.
Figure 6:
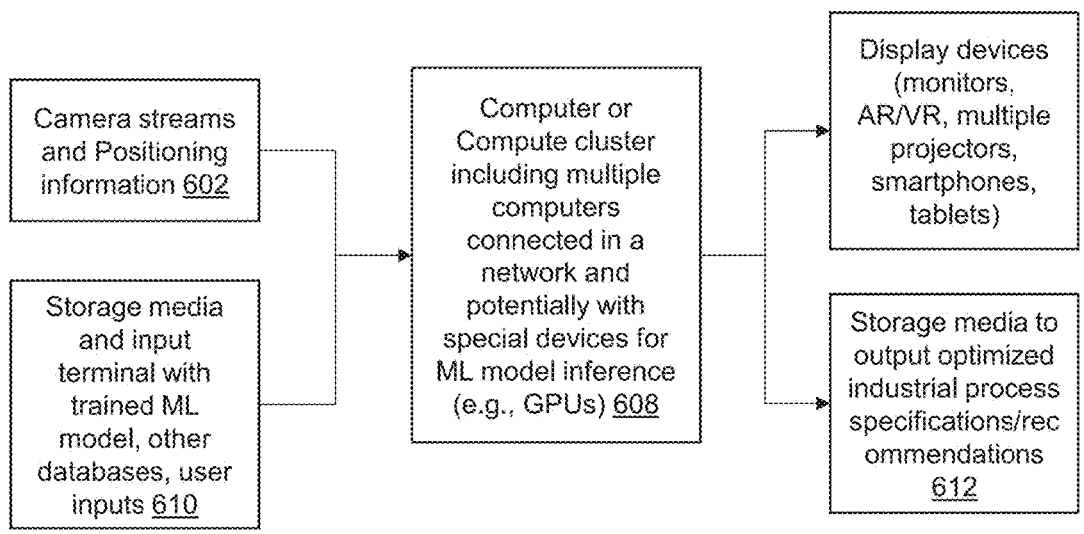

FIG. 6 is a process flow 600 depicting a physical implementation of the ML-based system 102 with ML training, in accordance with an embodiment of the present disclosure. At step 602, the data associated with the one or more streams (e.g., video streams and positioning information) is obtained from one or more sources (e.g., the one or more video capturing units and the one or more positioning systems). At step 604, training data for training the ML model are stored in storage media. At step 606, a plurality of computing devices are connected in a network and configured with special devices for training the ML model. In an embodiment, the trained ML model with training data is stored in the storage media.

Upon training the ML model, the information associated with the one or more streams (e.g., video streams and positioning information) is obtained from one or more sources (e.g., the one or more video capturing units and the one or more positioning systems). At step 608, the one or more inferences related to one or more precedence relationships between the one or more actions. The one or more precedence relationships between the one or more actions are computed using the trained ML model, based on the information associated with the one or more streams (as shown in step 602), and information from at least one of: storage media, input terminal with trained ML model, other databases, and user inputs, as shown in step 610. At step 612, the one or more recommendations and specifications on the one or more optimized industrial processes are provided.

Figure 7:
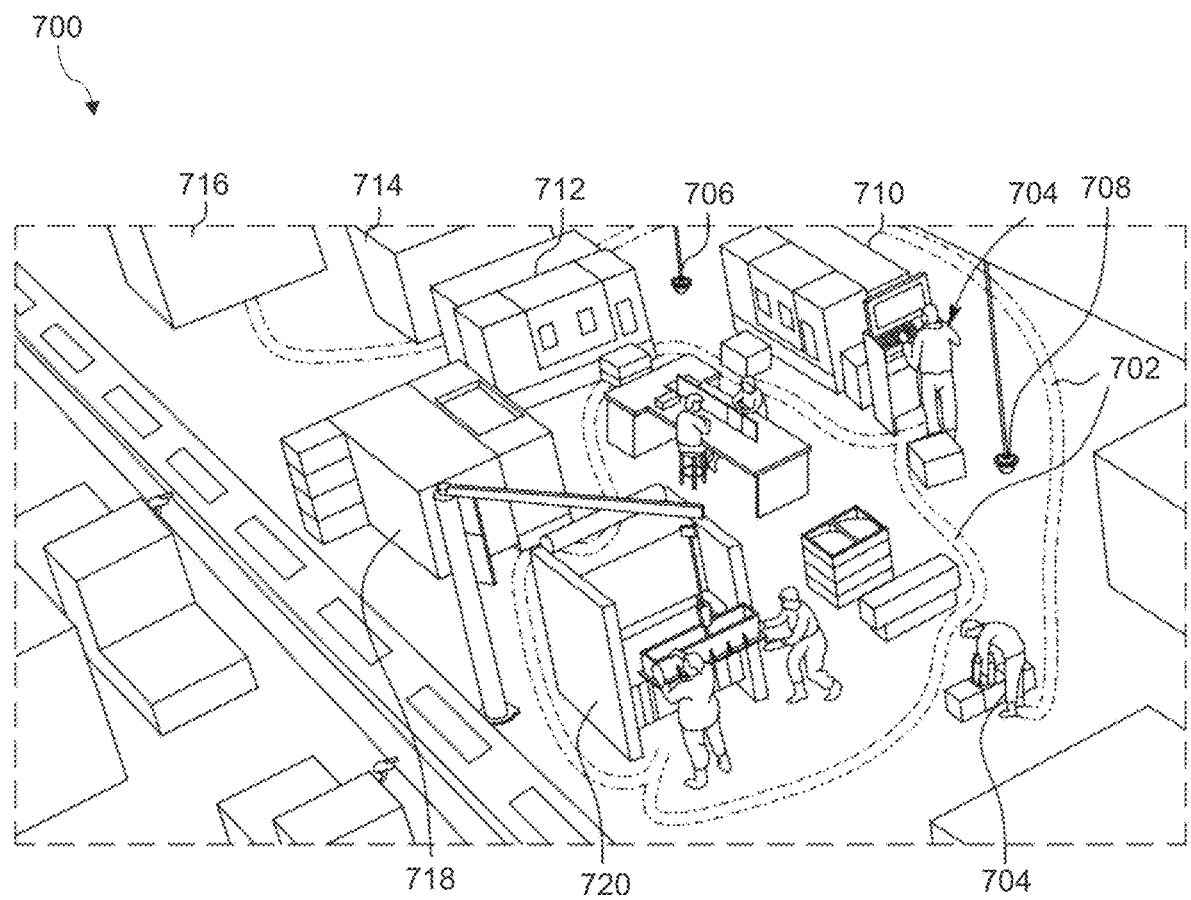
FIG. 7 is an exemplary contextual representation of the one or more environments with an implementation of the ML-based system, in accordance with an embodiment of the present disclosure.

FIG. 7 is an exemplary contextual representation 700 of the one or more environments with an implementation of the ML-based system 102, in accordance with an embodiment of the present disclosure. The exemplary contextual representation 700 shows the one or more trajectories 702 of human frontline workers 704 on a factory floor. The one or more trajectories may be computed through at least one of: the one or more video capturing units (706, 708), the one or more indoor positioning systems (not shown), and combination thereof. The one or more trajectories may be computed by the trajectories computing subsystem 208 and the one or more optimized industrial processes are predicted and optimized by the industrial process predicting subsystem 216 based on at least one of: the movements, activities, and actions, of one or more objects (710-720) (e.g., static assets including machines, workstation, and the like) and the one or more second objects (moving assets including e.g., fork lifts and Automated guided vehicles (AGVs), and humans).

Figure 8:
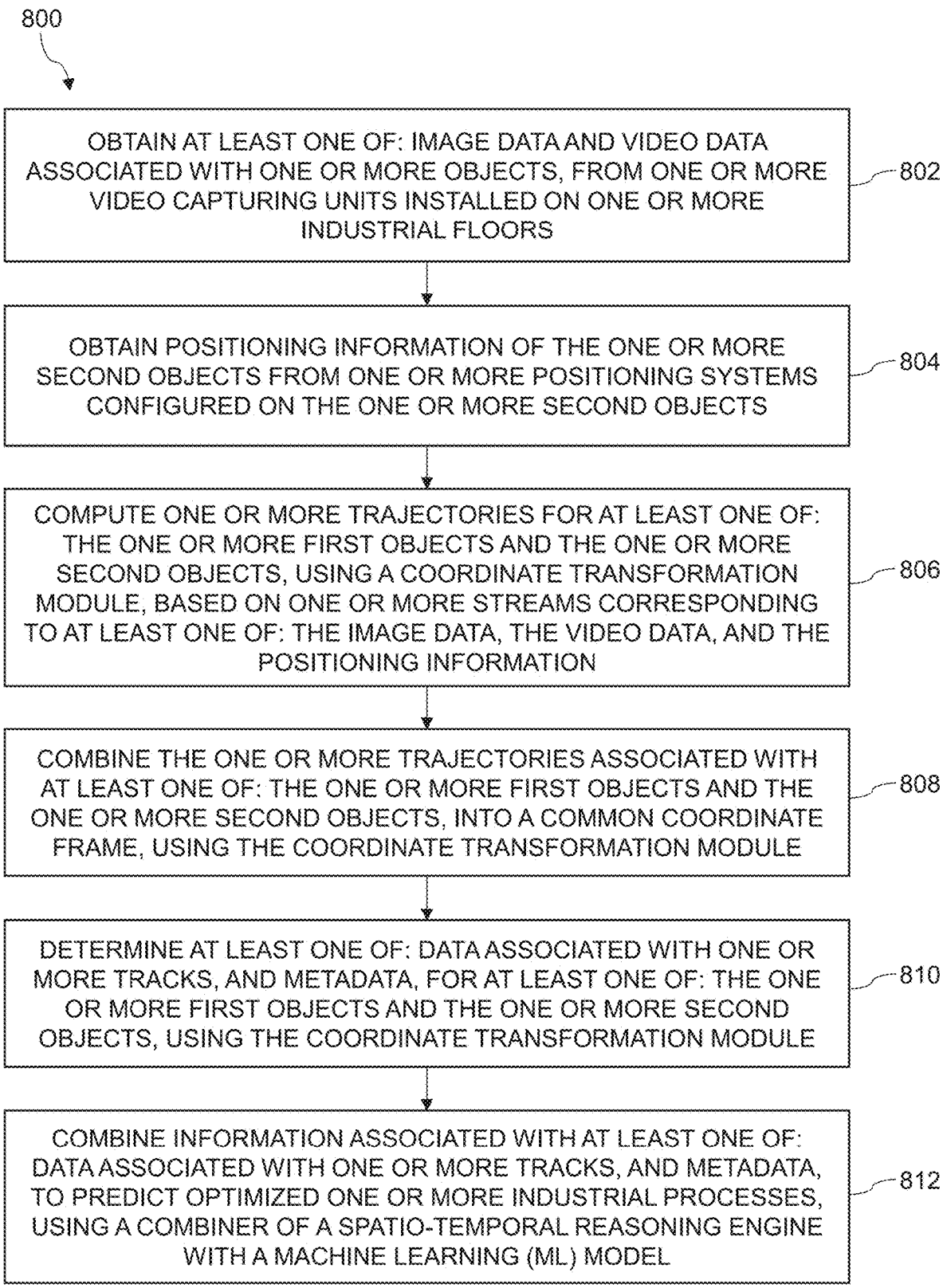
FIG. 8 is a flow chart illustrating a machine-learning based (ML-based) method for optimizing the one or more industrial processes by analyzing the one or more layouts of the one or more environments, in accordance with an embodiment of the present disclosure.

FIG. 8 is a flow chart illustrating a machine-learning based (ML-based) method 800 for optimizing the one or more industrial processes by analyzing the one or more layouts of the one or more environments, in accordance with an embodiment of the present disclosure.

At step 802, at least one of: the image data and the video data associated with the one or more objects, from the one or more video capturing units installed on the one or more industrial floors. In an embodiment, the one or more objects may include at least one of: the one or more first objects and the one or more second objects.

At step 804, the positioning information of the one or more second objects is obtained from the one or more positioning systems configured on the one or more second objects.

At step 806, the one or more trajectories are computed for at least one of: the one or more first objects and the one or more second objects, using a coordinate transformation module, based on one or more streams corresponding to at least one of: the image data, the video data, and the positioning information.

At step 808, the one or more trajectories associated with at least one of: the one or more first objects and the one or more second objects, are combined into the common coordinate frame, using the coordinate transformation module.

At step 810, at least one of: the data associated with the one or more tracks, and the metadata, are determined for at least one of: the one or more first objects and the one or more second objects, using the coordinate transformation module. In an embodiment, the metadata include at least one of: the subsequent locations of at least one of: the one or more first objects and the one or more second objects, the type of movements of at least one of: the one or more first objects and the one or more second objects, and the state of at least one of: the one or more first objects and the one or more second objects.

At step 812, the information associated with at least one of: the data associated with the one or more tracks, and the metadata, are combined to predict the one or more optimized industrial processes, using the combiner of the spatio-temporal reasoning engine. In an embodiment, the information is corresponding to the plurality of instances of the one or more activities with one or more objectives associated with one or more industrial processes.

The present invention has following advantages. The present invention with sensors and the ML-based system 102 is configured to compute motion trajectories of the humans including at least one of: the frontline workers and customers, and material handling equipment in working environments including at least one of: factories, warehouses, surgery rooms, departmental stores, shopping centers, kitchens, restaurants, and the like. The present invention with the ML-based system 102 is further configured to provide analytical information about the one or more trajectories, including walk time, idle time, value added time versus non-value added time, wasted time, and the like. The present invention with the ML-based system 102 is further configured to provide alternative layouts for the one or more assets in the space such that underlying tasks improve from productivity, quality, and/or safety perspectives.

The present invention with the ML-based system 102 is further configured to provide alternative motion trajectories that improve the underlying tasks from productivity, quality, and/or safety perspectives. The present invention with the ML-based system 102 is further configured to optimize diverse tasks that may need to be performed on a given set of assets (e.g. building a variety of products that each require a subset of machines and workstations in a factory). The present invention with the ML-based system 102 is further configured to optimize changeover time (i.e., startup time or setup time or Single Minute Exchange of Dies (SMED)) which is the total time it takes to switch a production process from making one product to another, as well as provide rules and signals to sequence production orders for different products to optimize production volume or other metrics. The present invention with the ML-based system 102 is further configured to provide automatic line rebalance that can balance the workload on different workstations and machines so that none of them becomes a bottleneck.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based system 102 either directly or through intervening I/O controllers. Network adapters may also be coupled to the ML-based system 102 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based system 102 in accordance with the embodiments herein. The ML-based system 102 herein comprises at least one processor or central processing unit (CPU). The CPUs are interconnected via the system bus 202 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based system 102. The ML-based system 102 can read the inventive instructions on the program storage devices and follow these instructions to execute the methodology of the embodiments herein.

The ML-based system 102 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

We claim:

1. A machine learning based (ML-based) method for optimizing one or more industrial processes, the ML-based method comprising:

obtaining, by one or more hardware processors, at least one of: image data and video data associated with one or more objects, from one or more video capturing units installed on one or more industrial floors, wherein the one or more objects comprise at least one of: one or more first objects and one or more second objects;

obtaining, by the one or more hardware processors, positioning information of the one or more second objects from one or more positioning systems configured on the one or more second objects;

computing, by the one or more hardware processors, one or more trajectories for at least one of: the one or more first objects and the one or more second objects, using a coordinate transformation module, based on one or more streams corresponding to at least one of: the image data, the video data, and the positioning information;

combining, by the one or more hardware processors, the one or more trajectories associated with at least one of: the one or more first objects and the one or more second objects, into a common coordinate frame, using the coordinate transformation module;

determining, by the one or more hardware processors, at least one of: data associated with one or more tracks, and metadata, for at least one of: the one or more first objects and the one or more second objects, using the coordinate transformation module, wherein the metadata comprise at least one of: subsequent locations of at least one of: the one or more first objects and the one or more second objects, a type of movements of at least one of: the one or more first objects and the one or more second objects, and a state of at least one of: the one or more first objects and the one or more second objects;

combining, by the one or more hardware processors, information associated with at least one of: the data associated with the one or more tracks, and the metadata, to predict one or more optimized industrial processes, using a combiner of a spatio-temporal reasoning engine with a machine learning (ML) model, wherein the information is corresponding to a plurality of instances of one or more activities with one or more objectives associated with one or more industrial processes, wherein predicting the one or more optimized industrial processes further comprises determining, by the one or more hardware processors, one or more alternative static asset locations to perform the one or more objectives using at least one of: brute-force based layout search, a graph based algorithmic search, and a randomized layout search;

generating, by the one or more hardware processors, one or more reports and statistics associated with at least one of the: movements and the one or more activities of at least one of: the one or more first objects and the one or more second objects, and one or more actions performed by at least one of: the one or more first objects and the one or more second objects, on one or more assets across the industrial floors; and providing, by the one or more hardware processors, one or more recommendations on the one or more optimized industrial processes based on at least one of the: movements, activities, and actions, of at least one of: the one or more first objects and the one or more second objects, wherein the one or more optimized industrial processes comprise mitigation of time required to perform at least one of: changeovers, automatic line rebalancing, sequencing of production orders, packaging of one or more products across one or more stations.

2. The ML-based method of claim 1, wherein computing the one or more trajectories for at least one of: the one or more first objects and the one or more second objects, comprises:

detecting, by the one or more hardware processors, at least one of: the one or more first objects, the one or more second objects, and the one or more actions performed by at least one of: the one or more first objects, the one or more second objects, in an individual frame of the video data, wherein the one or more first objects comprise one or more static objects, and wherein the one or more second objects comprise one or more moving objects;

tracking, by the one or more hardware processors, the detected at least one of: the one or more objects and the one or more actions, across one or more frames of the video data to compute the one or more trajectories; and computing, by the one or more hardware processors, one or more locations by comparing the positioning information of the one or more second objects with infrastructure elements of the one or more positioning systems to compute the one or more trajectories.

3. The ML-based method of claim 1, further comprising applying, by the one or more hardware processors, calibration information into the one or more trajectories to manage geometric relationship between at least one of: the image data, the video data, and the positioning information of the one or more assets.

4. The ML-based method of claim 1, wherein predicting the one or more optimized industrial processes comprises classifying, by the one or more hardware processors, the one or more tracks into one or more classes comprising at least one of: idle, walk, run, work, value added time, and non-value added time, for at least one of: the one or more first objects and the one or more second objects, using the spatio-temporal reasoning engine with the ML model.

5. The ML-based method of claim 4, further comprising training, by the one or more hardware processors, the ML model, by:

obtaining, by the one or more hardware processors, one or more training datasets indicating the one or more classes comprising at least one of: idle, walk, run, work, value added time, and non-value added time, for at least one of: the one or more first objects and the one or more second objects, wherein the one or more training datasets comprise at least one of: image data, video data, two dimensional tracking data, and three dimensional tracking data, which are classified into the one or more classes;

training, by the one or more hardware processors, the ML model on the one or more training datasets based on one or more model parameters; and classifying, by the one or more hardware processors, the one or more tracks into one or more classes comprising at least one of: idle, walk, run, work, value added time, and non-value added time, for at least one of: the one or more first objects and the one or more second objects, based on the trained ML model.

6. The ML-based method of claim 1, wherein predicting the one or more optimized industrial processes further comprises generating, by the one or more hardware processors, one or more inferences related to one or more precedence relationships between the one or more actions, wherein the one or more precedence relationships between the one or more actions are computed using the ML model.

7. The ML-based method of claim 1, wherein predicting the one or more optimized industrial processes further comprises providing, by the one or more hardware processors, one or more alternative activities for performing the one or more industrial processes upon detecting at least one of: individual assembly, packing, and setup steps, in the one or more video capturing units.

8. A machine learning based (ML-based) system for optimizing one or more industrial processes, the ML-based system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data obtaining subsystem configured to:

obtain at least one of: image data and video data associated with one or more objects, from one or more video capturing units installed on one or more industrial floors, wherein the one or more objects comprise at least one of: one or more first objects and one or more second objects; and obtain positioning information of the one or more second objects from one or more positioning systems configured on the one or more second objects;

a trajectories computing subsystem configured to compute one or more trajectories for at least one of: the one or more first objects and the one or more second objects, using a coordinate transformation module, based on one or more streams corresponding to at least one of: the image data, the video data, and the positioning information;

a coordination subsystem configured to combine the one or more trajectories associated with at least one of: the one or more first objects and the one or more second objects, into a common coordinate frame, using the coordinate transformation module;

an object tracks determining subsystem configured to determine at least one of: data associated with one or more tracks, and metadata, for at least one of: the one or more first objects and the one or more second objects, using the coordinate transformation module;

wherein the metadata comprise at least one of: subsequent locations of at least one of: the one or more first objects and the one or more second objects, a type of movements of at least one of: the one or more first objects and the one or more second objects, and a state of at least one of: the one or more first objects and the one or more second objects;

an industrial process predicting subsystem configured to combine information associated with at least one of: the data associated with the one or more tracks, and the metadata, to predict one or more optimized industrial processes, using a combiner of a spatio-temporal reasoning engine with a machine learning (ML) model, wherein the information is corresponding to a plurality of instances of one or more activities with one or more objectives associated with one or more industrial processes, wherein in predicting the one or more optimized industrial processes, the industrial process predicting subsystem is further configured to determine one or more alternative static asset locations to perform the one or more objectives using at least one of: brute-force based layout search, a graph based algorithmic search, and a randomized layout search;

a report generating subsystem configured to generate one or more reports and statistics associated with at least one of the: movements and the one or more activities of at least one of: the one or more first objects and the one or more second objects, and one or more actions performed by at least one of: the one or more first objects and the one or more second objects, on one or more assets across the industrial floors; and a recommendation subsystem configured to provide one or more recommendations on the one or more optimized industrial processes based on at least one of the: movements, activities, and actions, of at least one of: the one or more first objects and the one or more second objects, wherein the one or more optimized industrial processes comprise mitigation of time required to perform at least one of: changeovers, automatic line rebalancing, sequencing of production orders, packaging of one or more products across one or more stations.

9. The ML-based system of claim 8, wherein in computing the one or more trajectories for at least one of: the one or more first objects and the one or more second objects, the trajectories computing subsystem is configured to:

detect at least one of: the one or more first objects, the one or more second objects, and the one or more actions performed by at least one of: the one or more first objects, the one or more second objects, in an individual frame of the video data, wherein the one or more first objects comprise one or more static objects, and wherein the one or more second objects comprise one or more moving objects;

track the detected at least one of: the one or more objects and the one or more actions, across one or more frames of the video data to compute the one or more trajectories; and compute one or more locations by comparing the positioning information of the one or more second objects with infrastructure elements of the one or more positioning systems to compute the one or more trajectories.

10. The ML-based system of claim 8, further comprising a calibration subsystem configured to apply calibration information into the one or more trajectories to manage geometric relationship between at least one of: the image data, the video data, and the positioning information of the one or more assets.

11. The ML-based system of claim 8, wherein in predicting the one or more optimized industrial processes, the industrial process predicting subsystem is configured to classify the one or more tracks into one or more classes comprising at least one of: idle, walk, run, work, value added time, non-value added time, for at least one of: the one or more first objects and the one or more second objects, using the spatio-temporal reasoning engine with the ML model.

12. The ML-based system of claim 11, further comprising a training subsystem configured to train the ML model, by:

obtaining one or more training datasets indicating the one or more classes comprising at least one of: idle, walk, run, work, value added time, and non-value added time, for at least one of: the one or more first objects and the one or more second objects, wherein the one or more training datasets comprise at least one of: image data, video data, two dimensional tracking data, and three dimensional tracking data, which are classified into the one or more classes;

training the ML model on the one or more training datasets based on one or more model parameters; and classifying the one or more tracks into one or more classes comprising at least one of: idle, walk, run, work, value added time, and non-value added time, for at least one of: the one or more first objects and the one or more second objects, based on the trained ML model.

13. The ML-based system of claim 8, wherein in predicting the one or more optimized industrial processes, the industrial process predicting subsystem is further configured to generate one or more inferences related to one or more precedence relationships between the one or more actions, wherein the one or more precedence relationships between the one or more actions are computed using the ML model.

14. The ML-based system of claim 8, wherein in predicting the one or more optimized industrial processes, the industrial process predicting subsystem is further configured to provide one or more alternative activities for performing the one or more industrial processes upon detecting at least one of: individual assembly, packing, and setup steps, in the one or more video capturing units.

15. A non-transitory computer-readable storage medium having instructions stored therein that when executed by one or more hardware processors, cause the one or more hardware processors to execute operations of:

obtaining at least one of: image data and video data associated with one or more objects, from one or more video capturing units installed on one or more industrial floors, wherein the one or more objects comprise at least one of: one or more first objects and one or more second objects;

obtaining positioning information of the one or more second objects from one or more positioning systems configured on the one or more second objects;

computing one or more trajectories for at least one of: the one or more first objects and the one or more second objects, using a coordinate transformation module, based on one or more streams corresponding to at least one of: the image data, the video data, and the positioning information;

combining the one or more trajectories associated with at least one of: the one or more first objects and the one or more second objects, into a common coordinate frame, using the coordinate transformation module;

determining at least one of: data associated with one or more tracks, and metadata, for at least one of: the one or more first objects and the one or more second objects, using the coordinate transformation module, wherein the metadata comprise at least one of: subsequent locations of at least one of: the one or more first objects and the one or more second objects, a type of movements of at least one of: the one or more first objects and the one or more second objects, and a state of at least one of: the one or more first objects and the one or more second objects;

combining information associated with at least one of: the data associated with the one or more tracks, and the metadata, to predict one or more optimized industrial processes, using a combiner of a spatio-temporal reasoning engine with a machine learning (ML) model, wherein the information is corresponding to a plurality of instances of one or more activities with one or more objectives associated with one or more industrial processes,
  wherein predicting the one or more optimized industrial processes further comprises determining one or more alternative static asset locations to perform the one or more objectives using at least one of: brute-force based layout search, a graph based algorithmic search, and a randomized layout search;

generating one or more reports and statistics associated with at least one of the: movements and the one or more activities of at least one of: the one or more first objects and the one or more second objects, and one or more actions performed by at least one of: the one or more first objects and the one or more second objects, on one or more assets across the industrial floors; and providing one or more recommendations on the one or more optimized industrial processes based on at least one of the: movements, activities, and actions, of at least one of: the one or more first objects and the one or more second objects, wherein the one or more optimized industrial processes comprise mitigation of time required to perform at least one of: changeovers, automatic line rebalancing, sequencing of production orders, packaging of one or more products across one or more stations.

* * * * *